(No Model.) 3 Sheets—Sheet 1.
E. J. HOUGHTON & T. M. COLLET.
REVERSING GEAR FOR DYNAMO ELECTRIC MACHINES.
No. 351,699. Patented Oct. 26, 1886.
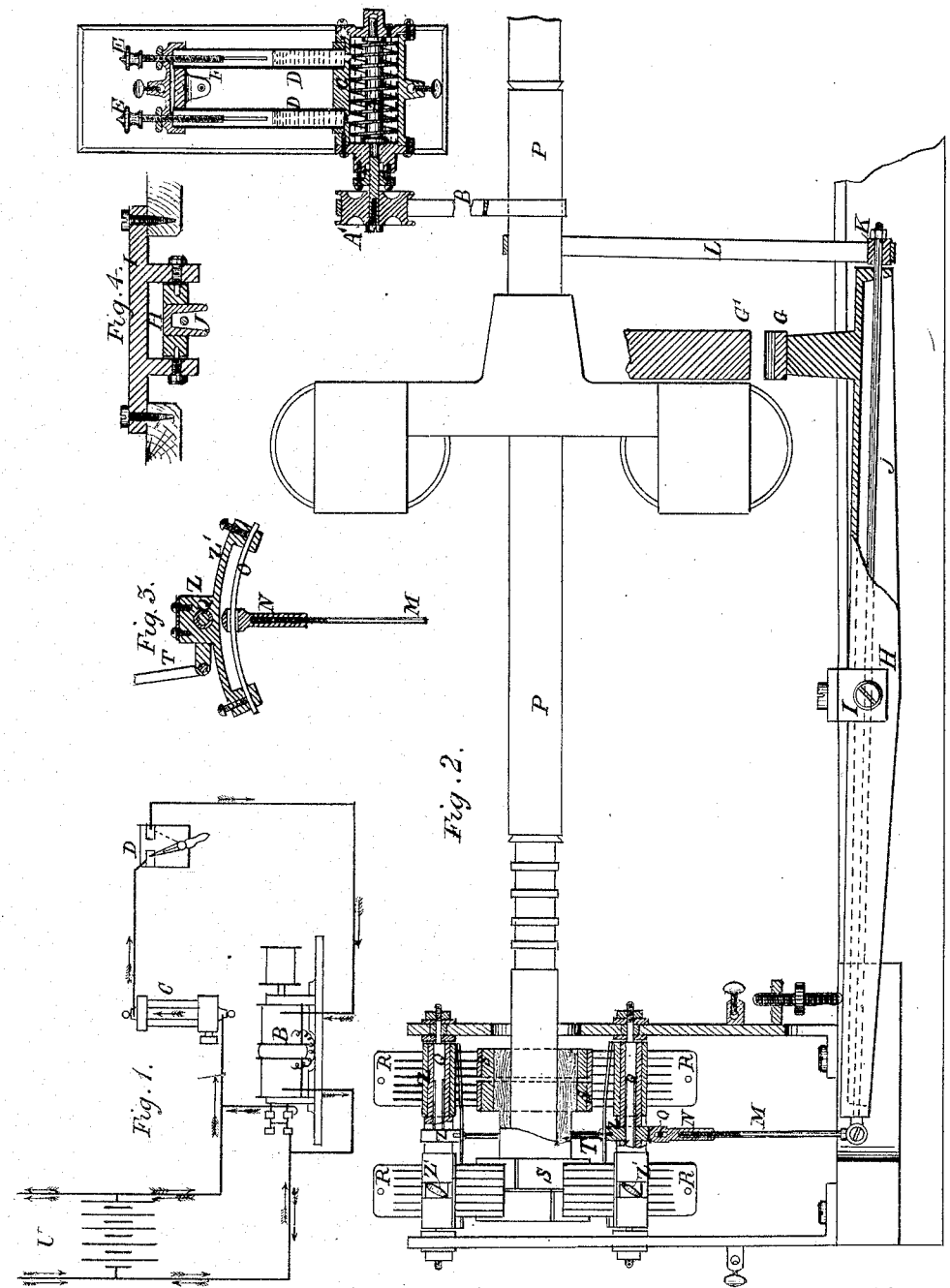
Witnesses
J. A. Rutherford
Robert Everett
Inventors,
Edward J. Houghton
Thomas M. Collet
By James L. Norris
Atty.

(No Model.) 3 Sheets—Sheet 2.
E. J. HOUGHTON & T. M. COLLET.
REVERSING GEAR FOR DYNAMO ELECTRIC MACHINES.
No. 351,699. Patented Oct. 26, 1886.
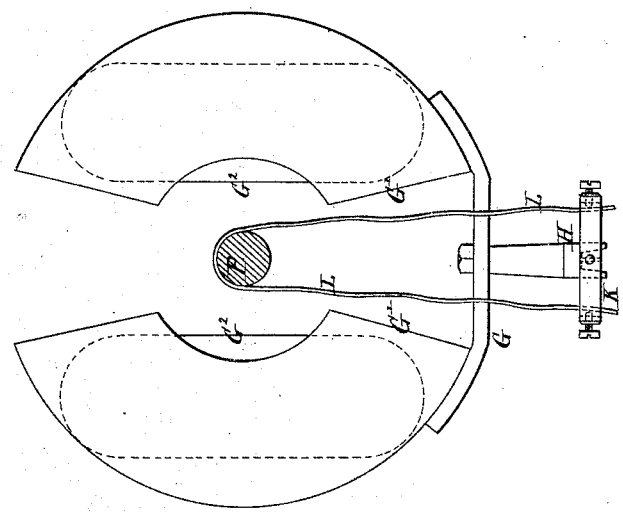
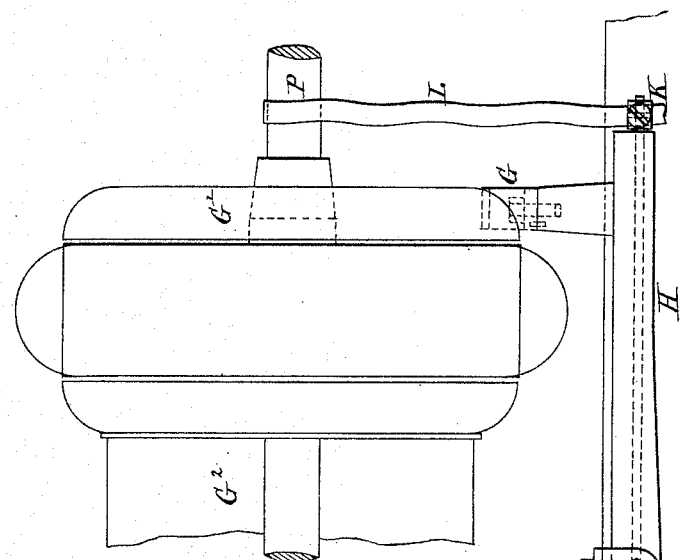
Witnesses.
Jo. L. Coombs
Robert Everett.
Inventors.
Edward J. Houghton.
Thomas M. Collet
By James L. Norris.
Atty.

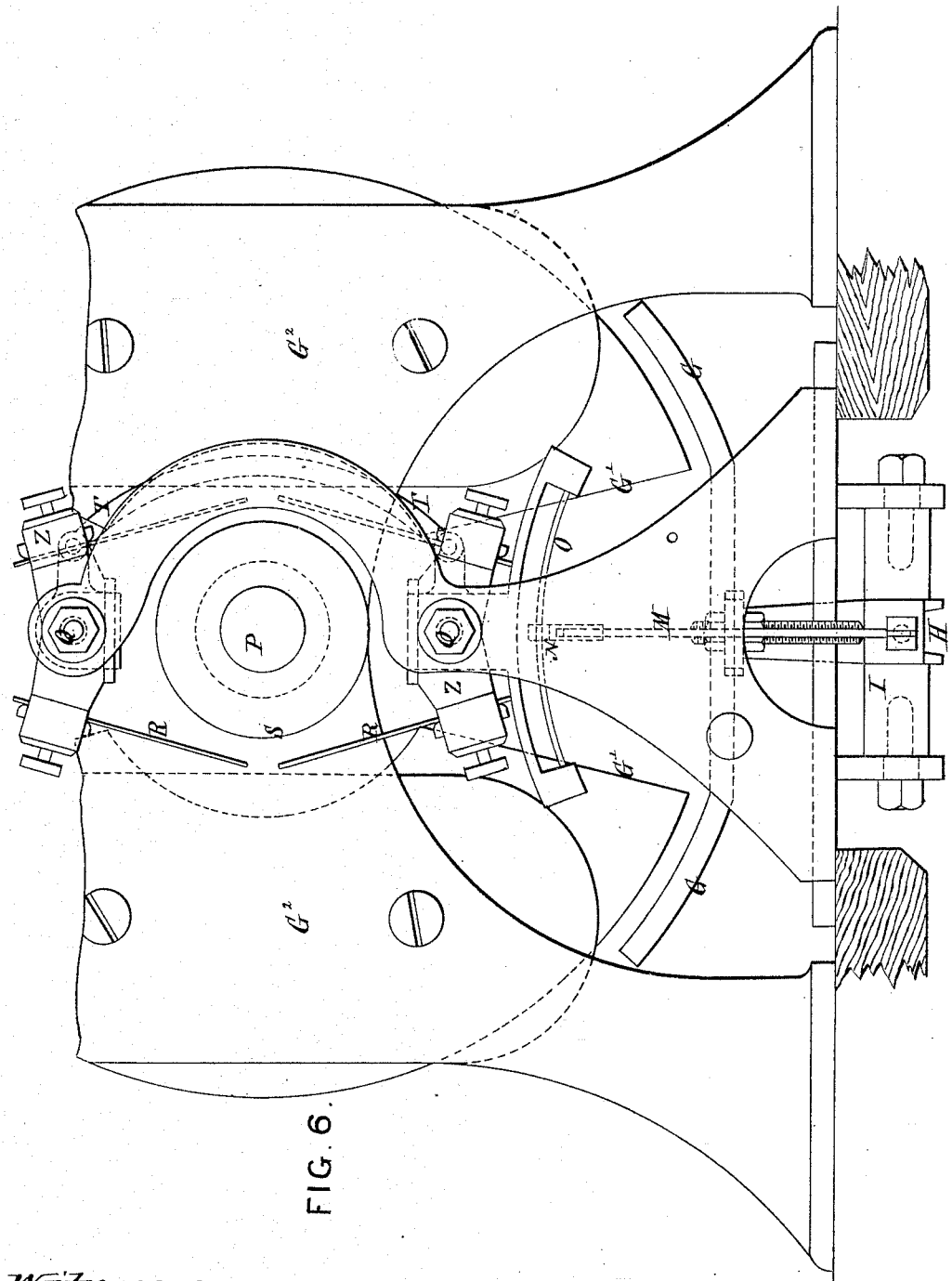

UNITED STATES PATENT OFFICE.

EDWARD JOHN HOUGHTON, OF PECKHAM, COUNTY OF SURREY, AND THOMAS MARSHALL COLLET, OF GREAT WINCHESTER STREET, COUNTY OF MIDDLESEX, ENGLAND.

REVERSING-GEAR FOR DYNAMO-ELECTRIC MACHINES.

SPECIFICATION forming part of Letters Patent No. 351,699, dated October 26, 1886.

Application filed August 25, 1885. Serial No. 175,318. (No model.) Patented in England November 26, 1884, No. 15,597, and in France July 9, 1885, No. 170,055.

*To all whom it may concern:*

Be it known that we, EDWARD JOHN HOUGHTON and THOMAS MARSHALL COLLET, citizens of England, residing, respectively, at Peckham, in the county of Surrey, England, and at Great Winchester Street, in the county of Middlesex, England, have invented new and useful Improvements in Contact and Reversing Gear for Dynamo-Electric, Magneto-Electric, and Electro-Dynamic Machines, (for which we have obtained a patent in Great Britain, dated November 26, 1884, No. 15,597,) of which the following is a specification.

In the United States Patent No. 288,888, dated November 20, 1883, granted to Stroudley and Houghton, was described an arrangement of apparatus for generating electricity from motive-power applied thereto in different directions, in which two sets of commutator-brushes of a dynamo-electric or magneto-electric machine were arranged on swinging carriers actuated by a governor driven from the electrical machine, so that, according as the machine was driven in one direction or another, the governor caused the one or the other set of brushes to make contact with the commutator, while at the same time the governor actuated contact-makers in such manner that when a certain speed was obtained the field-magnets of the machine were first excited and then the circuit to the battery was completed. This arrangement is mainly applicable to a dynamo-machine employed on a railway-train for charging the secondary batteries of electric light installation, the dynamo-machine being driven from a carriage-axle when running in either direction. With this arrangement it is necessary that the battery-circuit should not be closed until the armature of the dynamo-machine has attained such a speed that the current produced exceeds in strength the current proceeding from the battery, as otherwise the current of the latter in passing back through the dynamo-machine would reverse its polarity, and thus render it inactive. It is consequently necessary, on starting the train in one direction or the other, first to bring the contact-brushes into correct position for the direction in which the armature is driven, then to close the circuit of the field-magnets, and after the machine has attained the requisite speed to close the battery-circuit by bringing the brushes in contact.

According to our present invention we effect the above-described operations without the use of a governor and sliding contact-makers by means of the following arrangement of apparatus. A vessel containing mercury, or other conducting-fluid, has at each end a vertical tube of insulating material, and contains a screw-blade, the axis of which is driven by a belt from the revolving armature-spindle of the electrical machine, so that, according as the screw-blade is driven in one direction or the other, the mercury is caused to rise in the one or the other tube, and, when the armature-spindle attains the required speed, to make electrical contact with an adjustable contact-screw at the upper end of the tube, whereby, in either case, the shunt or field circuit of the electrical machine is closed. The field-magnets of the machine, when excited by the said closing of the shunt-circuit, attract an armature fixed on a lever, which, in being thereby moved on its fulcrum, causes the one or the other set of commutator-brushes to be brought into contact, so as to close the accumulator and lamp-circuit. For this purpose the lever carries a small spindle, running parallel with it, one end of which carries a cross-bar, to which are secured the ends of a strap, which also passes round the armature-spindle. The other end of the small cylinder is connected to an upright rod having a screwed sleeve at its upper end, a loop on which embraces a curved bar carried by opposite curved arms on the one rocking frame of the commutator-brushes.

The before-mentioned strap, having its ends connected with the cross-bar of the lever, is so arranged that when the armature-spindle begins to rotate it moves the strap so as to cant the cross-bar, and consequently to partially rotate the small spindle in one direction or the other, thereby also bringing the loop of the upright rod to the one or the other extreme position on the arms of the brush-frame, so that on the subsequent movement of the lever, consequent on the attraction of its armature, as before described, the said rod cants the brush-frame in one direction or the other on its pivot, thereby bringing the one or the other of the brushes in contact, and this brush-frame, being connected with the other one in any suitable manner, will cause a corresponding motion of the latter. When the speed of the electrical machine is reduced to a certain extent, the mercury will fall in the before-mentioned tubes, so as to break contact with the contact-screw, and will thus instantaneously cause the field or shunt circuit to be broken. The lever that actuates the commutator-brushes being now released by the magnet of the revolving armature drops, and thus causes the brushes to move back into their middle position, so as to break the charging-circuit, and thus prevent the reversal of the current.

It will be evident that the above-described improvements may be applied to any shunt dynamo-electric, magneto-electric, and electro-dynamic machines.

Figure 1 of the accompanying drawings shows a diagram of the electric circuit and connections. Fig. 2 shows a sectional side elevation of part of a Brush dynamo-machine with the above-described invention applied thereto. Fig. 2ᵃ shows a part side elevation of one end thereof. Fig. 3 shows a section of the contact-brush-reversing device. Fig. 4 shows a cross-section of the lever H. Figs. 5 and 6 show opposite end views.

Within a cylindrical casing, C, containing mercury or other conducting-fluid, is a worm or coarse-threaded screw, A, the axis of which carries a pulley, A', driven in one direction or the other by a belt, B, from the spindle P of the armature of the electrical machine, so that, by the rotation of the screw A in one direction or the other, the mercury is caused to rise in the one or the other of the tubes D D, fixed to the casing C. These tubes, which are made of glass, insulite, or other suitable non-conductor of electricity, have their upper ends fixed in a metal cap containing two contact-screws, E E, and a passage, F, establishing a communication between the tubes. The position of the contact-screws E is so adjusted that when the dynamo-spindle P attains the desired speed the mercury is raised by the action of the screw A to such a height in one of the tubes as to make contact with one of the screws E, thus closing the shunt or field circuit of the electrical machine. Immediately upon this occurring the two poles G' of the electro-magnets G² (which are the ordinary field-magnets of the Brush dynamo-machine) attract the armature G, fixed on a lever, H, pivoted on a fulcrum at I, so that that end of the lever is raised and the opposite end is depressed. The lever H is of a trough-shaped section, as shown at the cross-section, Fig. 4, and within it is a metal rod, J, capable of rocking in bearings on the lever, and having at one end a beam, K, to which is attached a strap, L, which passes round the armature-spindle and is adjusted so as to be just tight enough to support the lever H in the position shown when no current is flowing through the field-circuit of the electric machine. The other end of the rod J has a cross-head, to which is pivoted a rod, M, the upper end of which is screwed to the socket of a loop, N, embracing the curved rod O, carried by the arms Z', projecting on either side of the lower frame, Z, of the commutator-brushes, as shown in the cross-section of the part at Fig. 3, and in the end view at Fig. 6. At the first movement of the armature-spindle P in one direction or the other, it causes the strap L to cant the beam K, and consequently to rock the rod J on its axis in one direction or the other, whereby the rod M will have its loop N moved over to the one or the other end of the rod O, when the motion of the rod will be stopped. The spindle P continuing to revolve, the strap L will slip upon it until, by the before-mentioned raising of the lever, consequent upon the attraction of the poles G', the strap will become quite loose upon the spindle. By such motion of the lever the downward pull of the rod M will cause the brush-holder Z to be canted on its axis Q, so as to bring the set of contact-brushes R which correspond to the direction of rotation in contact with the commutator, while at the same time the lower brush-holder is made to cant the upper one in a corresponding direction by means of the connecting-rod T.

When the speed of the armature-spindle becomes reduced sufficiently to break contact between the mercury and the screw F, the field or shunt circuit is instantly broken, whereby the poles G' will be made to release the lever H, so that the rod M in rising will allow the brushes R to move out of contact with the commutator, and will retain them there, thus breaking the charging-circuit.

In the diagram of the connection at Fig. 1, U is the secondary battery; B, the electrical machine; C, the mercury-contact apparatus, and D the switch.

Having thus described the nature of our invention, and the best means we know for carrying the same into practical effect, we claim—

1. In an electrical generator, a contact apparatus consisting of a screw or worm, A, contained in a vessel, C, charged with mercury or other conducting-fluid, and having two vertical tubes, D, provided with contact-screws E at their upper end, the said screw A being rotated by the electrical machine, so that when this attains a certain speed the liquid in rising in the one or the other of the tubes will make contact with the screw, substantially as and for the purposes herein described.

2. In an electrical generator arranged to run in both directions, the combination, with the commutator-brushes, of reversing apparatus, consisting of a pivoted lever, H, carrying at one end an armature, G, attracted by the poles G' of the field-magnets of the machine, the brush-holders Z, a rod, J, connected at one end with the brush-holders and at the other end to the armature-spindle, whereby on the commencement of the rotation the spindle first moves said rod J into position for bringing one set of brushes into contact, after which the lever H, by attraction, causes the rod to bring said brushes into contact, substantially as described.

3. The combination, with the spindle and its armature, of the field-magnets $G^2$, the pivoted lever H, carrying the armature G at one end, the rod J, having a cross-head at one end, the strap L, passing around the armature-spindle and having its ends connected with said cross-bar, the brush-holders Z, having the curved arms O and arms Z', and the connecting-rod M N, substantially as described.

4. The combination of the vessel C for the conducting-fluid, having vertical tubes D, provided with contact-screws E, the worm or screw A in said vessel, the armature-spindle connected with the worm or screw, the field-magnets $G^2$, the lever H, carrying the armature G, the rod J, connected with the armature-spindle, the brush-holders Z, and connections between said rod and said brush-holders, substantially as and for the purposes described.

In testimony whereof we have signed our names to this specification, in the presence of two subscribing witnesses, this 4th and 12th days of August, A. D. 1885.

EDWARD JOHN HOUGHTON.
THOMAS MARSHALL COLLET.

Witnesses to the signature of Edward John Houghton:
W. J. NORWOOD,
I. LAKE,
*Both of No. 17 Gracechurch Street, London.*

Witnesses to the signature of Thomas Marshall Collet:
JNO. DEAN,
W. J. NORWOOD.
*Both of No. 17 Gracechurch Street, London.*